(12) United States Patent
Liang et al.

(10) Patent No.: US 9,519,838 B2
(45) Date of Patent: Dec. 13, 2016

(54) CHARACTER RECOGNITION METHOD

(71) Applicant: GRG Banking Equipment Co., Ltd., Guangzhou, Guangdong (CN)

(72) Inventors: Tiancai Liang, Guangzhou (CN); Kun Wang, Guangzhou (CN); Weifeng Wang, Guangzhou (CN); Siwei Liu, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/759,256

(22) PCT Filed: Jun. 26, 2013

(86) PCT No.: PCT/CN2013/077968
§ 371 (c)(1),
(2) Date: Jul. 6, 2015

(87) PCT Pub. No.: WO2014/107945
PCT Pub. Date: Jul. 17, 2014

(65) Prior Publication Data
US 2015/0356372 A1   Dec. 10, 2015

(30) Foreign Application Priority Data

Jan. 11, 2013 (CN) .......................... 2013 1 0012073

(51) Int. Cl.
*G06K 9/62* (2006.01)
*G06K 9/46* (2006.01)
(Continued)

(52) U.S. Cl.
CPC .............. *G06K 9/4633* (2013.01); *G06K 9/48* (2013.01); *G06T 5/002* (2013.01); *G06T 7/0083* (2013.01);
(Continued)

(58) Field of Classification Search
None
See application file for complete search history.

(56) References Cited

U.S. PATENT DOCUMENTS

| 5,790,701 A * | 8/1998 | Shijo | G06K 9/48 |
| | | | 382/197 |
| 7,174,043 B2 * | 2/2007 | Lossev | G06K 9/222 |
| | | | 382/186 |

(Continued)

FOREIGN PATENT DOCUMENTS

| CL | 1060-2015 | 5/2014 |
| CL | 1903-2015 | 7/2014 |

(Continued)

OTHER PUBLICATIONS

Chinese Office Action, dated Apr. 7, 2015, from corresponding Chinese Application No. 201310012073.8.

(Continued)

*Primary Examiner* — Daniel Mariam
(74) *Attorney, Agent, or Firm* — Wolf, Greenfield & Sacks, P.C.

(57) ABSTRACT

The present invention relates to a character recognition method. Same comprises: step 1: reading in a character image; step 2: image preprocessing; step 3: character splitting; step 4: edge extraction; utilizing an edge detection operator to detect edge points of characters; step 5: feature extraction, where the features of each edge point of each character are all expressed with distances running from other edge points of the character to the edge point and are represented by eigenvectors ($P_k$, $P_k$, . . . P); step 6: feature processing, mapping the eigenvectors ($P_k$, $P_k$, . . . P) into a matrix, T, thus allowing all characters to be identical in eigenvector dimension; and, step 7: template matching recognition. Because the features of each edge point of the characters are all expressed with the distances running from (Continued)

the other edge points to the edge point, the entirety of the features are ensured for the characters, and the difference in features are expanded for different characters, thus increasing character recognition accuracy.

4 Claims, 2 Drawing Sheets

(51) Int. Cl.
    *G06T 7/00*     (2006.01)
    *G06T 5/00*     (2006.01)
    *G06K 9/48*     (2006.01)

(52) U.S. Cl.
    CPC ......... *G06T 7/0085* (2013.01); *G06K 2209/01* (2013.01)

(56) References Cited

U.S. PATENT DOCUMENTS

| | | | | |
|---|---|---|---|---|
| 8,320,674 | B2* | 11/2012 | Guillou | G06K 9/3266 |
| | | | | 382/164 |
| 2001/0028740 | A1 | 10/2001 | Suzuki | |
| 2011/0249897 | A1 | 10/2011 | Chaki et al. | |
| 2015/0279141 | A1 | 10/2015 | Chen et al. | |
| 2016/0005253 | A1 | 1/2016 | Yamamoto et al. | |

FOREIGN PATENT DOCUMENTS

| | | |
|---|---|---|
| CL | 3308-2014 | 1/2016 |
| CN | 101488182 A | 7/2009 |
| CN | 101561866 A | 10/2009 |
| CN | 102663377 A | 9/2012 |
| CN | 102831416 A | 12/2012 |
| CN | 103049750 A | 4/2013 |
| CN | 101408933 A | 4/2015 |
| WO | WO 2015/184517 A1 | 12/2015 |

OTHER PUBLICATIONS

International Search Report dated Oct. 24, 2013 from corresponding International Application No. PCT/CN2013/077968.
Written Opinion of the International Searching Authority, dated Oct. 24, 2013, from corresponding International Application No. PCT/CN2013/077968.
Extended European Search Report, dated Apr. 7, 2016, from corresponding European Application No. 13870535.5.
Mori et al.: "Shape contexts enable efficient retrieval of similar shapes," (2001) IEEE; pp. 723-730.
Pillai: "Shape Context Matching for Efficient OCR," pp. 1-18, May 2012.
Thien M. Ha et al.: "Image Processing Methods for Document Image Analysis," (1997) World Scientific Publishing Company; pp. 1-47.
CHA: "Comprehensive Survey on Distance/Similarity Measures between Probability Density Functions," (2007) International Journal of Mathematical Models and Methods In Applied Sciences; pp. 300-307.
Chilean Office Action, dated May 11, 2016, from corresponding Chilean Application No. 1952-15.

* cited by examiner

CHARACTER RECOGNITION METHOD

This application is the national phase of International Application No. PCT/CN2013/077968, filed on Jun. 26, 2013, which claims the priority benefit of Chinese Patent Application No. 201310012073.8, titled "CHARACTER RECOGNITION METHOD", filed on Jan. 11, 2013 with the State Intellectual Property Office of China, which applications are hereby incorporated by reference to the maximum extent allowable by law.

FIELD

The disclosure belongs to the field of optical character recognition, and relates to a character recognition method.

BACKGROUND

During character recognition, character feature extraction is a crucial step. The feature extraction may be regarded as extraction for key information of original characters, thus the features should reflect differences among different characters as far as possible. In other words, differences between different types of character features should keep as far as possible. If features are selected inappropriately, a good recognition rate cannot be reached no matter what kind of classier is selected.

In general, to recognize a character, after edge of the character or skeleton of the character is extracted, features are extracted from the edge of the character or the skeleton of the character. In existing methods, when a point of the edge or the skeleton is described, only information about the current point itself is considered. For example, (x, y, f(x, y)) is used as a feature of the point of the edge or the skeleton, where x, y represent coordinates of a point P, and f(x, y) represents a brightness value. In this way, the extracted features are local. If two characters have similar local shapes (such as Q and O), features extracted form the two characters are highly similar, which makes it difficult to distinguish the two characters, and a recognition rate is poor.

Hence, it is very important to provide a new feature extraction method using another idea to describe points of the edge or skeleton of a character, so as to further distinguish character features, thereby improving a character recognition rate.

SUMMARY

The disclosure is to provide a character recognition method, to further differentiate features among different characters in order to improve character recognition rate.

The method includes following steps.

Step 1 includes: reading a character image.

Step 2 includes: image preprocessing.

Step 3 includes: character segmentation.

Step 4 includes: edge extraction, detecting edge points of the character by using an edge detecting operator.

Step 5 includes: feature extraction, i.e., expressing features of each edge point of each character by distances from rest edge points of the character to the edge point, where the features of the edge point of the character are represented by an eigenvector $(P_{1k}, P_{2k}, \ldots P_{Mk})$, thus eigenvectors of features of the character are represented by a matrix $$\begin{pmatrix} P_{21} & P_{31} & \ldots & P_{M1} \\ P_{12} & P_{32} & \ldots & P_{M2} \\ \vdots & \vdots & \ddots & \vdots \\ P_{1M} & P_{2M} & \ldots & P_{(M-1)M} \end{pmatrix}.$$

Step 6 includes: feature processing, i.e., feature processing, i.e., mapping the eigenvector $(P_{1k}, P_{2k} \ldots P_{Mk})$ to a matrix T, to obtain a same dimension for eigenvectors of all characters, where $$T = \begin{pmatrix} t_{11} & t_{12} & \ldots & t_{1v} \\ t_{21} & t_{22} & \ldots & t_{2v} \\ \vdots & \vdots & \ddots & \vdots \\ t_{u1} & t_{u2} & \ldots & t_{uv} \end{pmatrix}.$$

Step 7 includes: template matching, i.e., assuming that an edge of a character $\Theta$ to be recognized has M points $X_1, X_2 \ldots X_M$ and a standard character template $\Delta$ has N points $Y_1, Y_2 \ldots Y_N$, calculating a distance between the point $X_i$ and the point $Y_j$ in the standard character template $\Delta$ by an equation as:

$$D_{ij} \equiv D(X_i, Y_j) = \sum_{m=1}^{u} \sum_{n=1}^{v} (T_i(m, n) - T_j(m, n))^2;$$

denoting $D_{i\pi(i)} = \min D_{ij}$, which indicates that a point $Y_{\pi(i)}$ in the standard character template $\Delta$ is a best matching point for the point $X_i$, a total distance from the character $\Theta$ to be recognized to the standard character template $\Delta$ being $$D_{\Theta\Delta} = \sum_{i=0}^{M} D_{i\pi(i)};$$

and in a case that there are total $\Gamma$ standard character templates, calculating total distances from the character $\Theta$ to be recognized to each standard character template respectively, and a template with a minimal distance to the character is a recognition result for the character.

Preferably, the method for feature processing in step 6 further includes following steps.

Step 61 includes: assuming one component $P_{ij}$ of an eigenvector of any point of edge of a character as $P_{ij}=(l_{ij},\theta_{ij})$, $l_{ij} \in [0,L]$ and $\theta_{ij} \in [0,2\pi]$, forming a block matrix by dividing the interval $[0,L]$ into u equal parts and dividing the interval $[0,2\pi]$ into v equal parts, and mapping each component of the eigenvector of any point of the edge of the character to the block matrix according to values of $l_{ij}$ and $\theta_{ij}$.

Step 62 includes: setting that a component $t_{ij}$ of T is the number of eigen components $P_{ij}$ mapped to a jth block in an ith row, then the eigenvector $(P_{1k}, P_{2k} \ldots P_{Mk})$ of any point is converted into a u×v matrix, for example, $$\begin{pmatrix} 0 & 5 & \cdots & 0 \\ 3 & 6 & \cdots & 0 \\ \vdots & \vdots & \ddots & \vdots \\ 0 & 2 & \cdots & 0 \end{pmatrix};$$

and step 63 comprising: representing all features of each character as $$\begin{pmatrix} T_1 \\ T_2 \\ \vdots \\ T_M \end{pmatrix},$$

where each component $T_i$ is a u×v matrix.

Preferably, the image preprocessing in step 2 includes image denoising, image rotation correction and image binarization.

Preferably, the character segmentation in step 3 is to perform horizontal projection and vertical projection on the binarized character image to segment the binarized character image into characters.

By the character recognition method provided according to the disclosure, features of each edge point of a character are expressed by using distances from rest edge points of the character to the edge point of the character, then eigenvectors of each character are converted into matrixes with a same dimension, and template matching recognition is performed, so that overall features of the entire character is ensured, features of different characters are better differentiated, a problem that features extracted from similar regions of different characters are highly similar in a conventional feature extracting method is overcome, thereby improving a character recognition rate.

BRIEF DESCRIPTION OF THE DRAWINGS

The drawings are used to provide further understanding of the disclosure, as a part of the specification, are used with embodiments of the disclosure to explain the disclosure, and are not meant to limit the disclosure. In the drawings.

DESCRIPTION

Technical solutions of the embodiments of the present disclosure will be illustrated completely and clearly with the drawings for the embodiments of the disclosure. Apparently, the described embodiments are merely a few rather than all of the embodiments of the present disclosure. All other embodiments obtained by people of ordinary skill in the art based on the embodiments of the present disclosure without creative efforts shall fall within the protection scope of the present disclosure.

Figure 1:
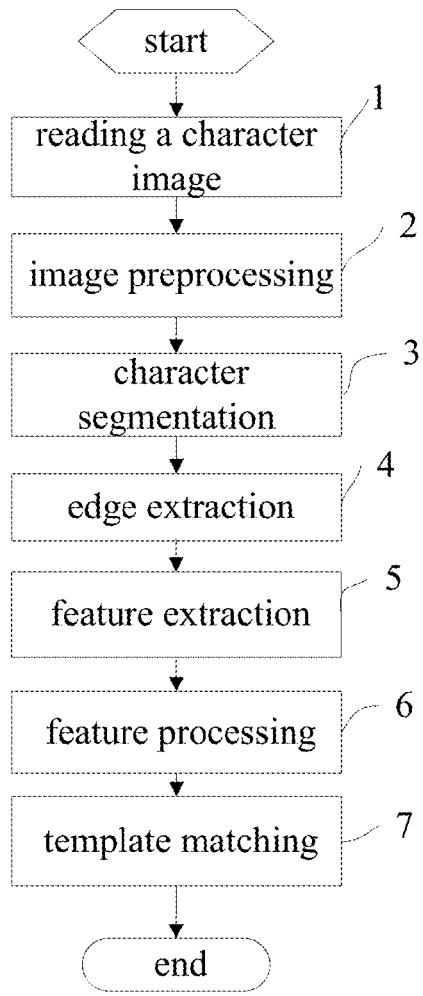
FIG. 1 is a flow chart of a character recognition method provided according to a preferable embodiment of the disclosure.
Figure 2:
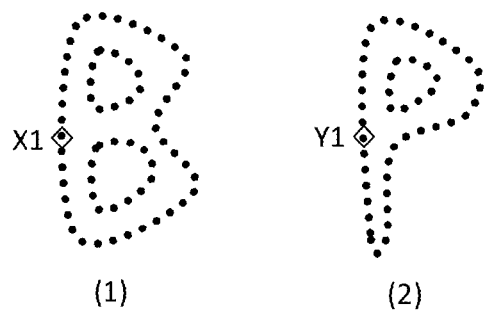
FIG. 2 is an example of a character to be recognized according to a preferable embodiment of the disclosure.

In conjunction with FIG. 1 and FIG. 2, a character recognition method proposed according to the disclosure is illustrated by taking recognition for two locally similar characters B and P as an example in the embodiment. The character recognition method includes following steps.

Step 1 includes: reading a character image such as an image of a crown size region of a banknote.

Step 2 includes: image preprocessing, including three steps: image denoising, image rotation correction and image binarization.

Step 3 includes: character segmentation, i.e., performing horizontal projection and vertical projection on the binarized character image to segment the binarized character image into characters.

Step 4 includes: edge extraction, i.e., detecting edge points of the character by using an edge detecting operator.

Step 5 includes: feature extraction, i.e., expressing features of each edge point of each character by distances from rest edge points of the character to the edge point, where the features of the edge point of the character are represented by an eigenvector ($P_{1k}$, $P_{2k}$ . . . $P_{Mk}$), thus eigenvectors of features of the character are represented by a matrix:

$$\begin{pmatrix} P_{21} & P_{31} & \cdots & P_{M1} \\ P_{12} & P_{32} & \cdots & P_{M2} \\ \vdots & \vdots & \ddots & \vdots \\ P_{1M} & P_{2M} & \cdots & P_{(M-1)M} \end{pmatrix}.$$

According to the embodiment, all features of the character B may be represented as $$\begin{pmatrix} P_{21} & P_{31} & \cdots & P_{M1} \\ P_{12} & P_{32} & \cdots & P_{M2} \\ \vdots & \vdots & \ddots & \vdots \\ P_{1M} & P_{2M} & \cdots & P_{(M-1)M} \end{pmatrix};$$

and all features of a character P may be represented as $$\begin{pmatrix} P'_{21} & P'_{31} & \cdots & P'_{N1} \\ P'_{12} & P'_{32} & \cdots & P'_{N2} \\ \vdots & \vdots & \ddots & \vdots \\ P'_{1N} & P'_{2N} & \cdots & P'_{(N-1)N} \end{pmatrix},$$

where the character B has M edge points, and the character P has N edge points.

Step 6 includes: feature processing, i.e., feature processing, i.e., mapping the eigenvector ($P_{1k}$, $P_{2k}$ . . . $P_{Mk}$) to a matrix T, in order to obtain a same dimension for eigenvectors of all characters, where $$T = \begin{pmatrix} t_{11} & t_{12} & \cdots & t_{1v} \\ t_{21} & t_{22} & \cdots & t_{2v} \\ \vdots & \vdots & \ddots & \vdots \\ t_{u1} & t_{u2} & \cdots & t_{uv} \end{pmatrix}.$$

Due to differences among characters, different characters may have different to number of edge points. In this case, if features are extracted according to the above method, a problem that eigenvectors have different dimensions may occur. For example, in a case that M≠N, ($P_{21}$, $P_{31}$ . . . $P_{M1}$) and ($P'_{21}$, $P'_{31}$ . . . $P'_{N1}$) have different dimensions, it is not suitable for some existing matching algorithms for recognition.

To solve this problem, a mapping can be established: f: $(P_{1k}, P_{2k} \ldots P_{Mk}) \to T_{u \times v}$.

Features $(P_{1k}, P_{2k} \ldots P_{Mk})$ of the edge point are mapped to a matrix, where $$T = \begin{pmatrix} t_{11} & t_{12} & \ldots & t_{1v} \\ t_{21} & t_{22} & \ldots & t_{2v} \\ \vdots & \vdots & \ddots & \vdots \\ t_{u1} & t_{u2} & \ldots & t_{uv} \end{pmatrix}.$$

Calculation of a component $t_{ij}$ of the matrix T is illustrated as follows.

Figure 3:
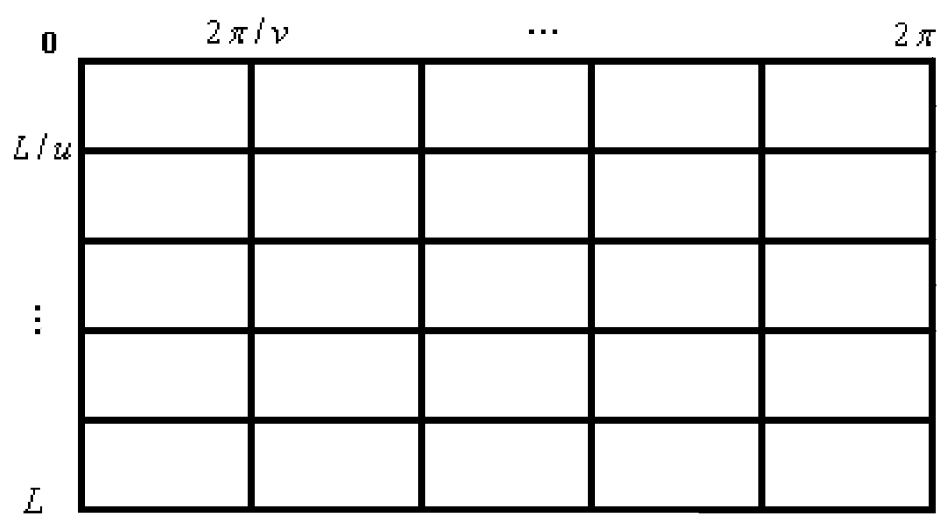
FIG. 3 is a block matrix diagram which is used to perform feature processing according to an embodiment.

Since $P_{ij}=(l_{ij}, \theta_{ij})$, $l_{ij} \in [0,L]$, $\theta_{ij} \in [0,2\pi]$, a block matrix is formed by dividing the interval $[0,L]$ into u equal parts and dividing the interval $[0,2\pi]$ into v equal parts, as shown in FIG. 3. For an eigenvector of an edge point of a character, such as a component $P_{21}=(l_{21}, \theta_{21})$ of $X_1 \sim (P_{21}, P_{31} \ldots P_{M1})$, $P_{21}$ is mapped to a block in FIG. 3 according to values of $l_{21}$ and $\theta_{21}$. Thus, each component of the eigenvector of the point $X_1$ can be mapped to a block in FIG. 3 according to this rule.

It is set that a component $t_{ij}$ of T is the number of feature components $P_{ij}$ mapped to a jth block in an ith row. In this way, the eigenvector $(P_{21}, P_{31} \ldots P_{M1})$ of point $X_1$ is converted into a u×v matrix similar to:

$$\begin{pmatrix} 0 & 5 & \ldots & 0 \\ 3 & 6 & \ldots & 0 \\ \vdots & \vdots & \ddots & \vdots \\ 0 & 2 & \ldots & 0 \end{pmatrix};$$

Therefore, features $(P_{1k}, P_{2k} \ldots P_{Mk})$ in any dimension may all be mapped to a matrix T with a same size, so that the problem that dimensions of eigenvectors are different is solved. According to this way, all features of a character can be represented as $$\begin{pmatrix} T_1 \\ T_2 \\ \vdots \\ T_M \end{pmatrix},$$

where each component $T_i$ is a u×v matrix.

Step 7 includes: template matching.

It is assumed that an edge of a character $\Theta$ to be recognized has M points $X_1, X_2 \ldots X_M$ and a standard character template $\Delta$ has N points $Y_1, Y_2 \ldots Y_N$. A distance between the point $X_i$ and the point $Y_j$ in the standard character template $\Delta$ is calculated by an equation as:

$$D_{ij} \equiv D(X_i, Y_j) = \sum_{m=1}^{u} \sum_{n=1}^{v} (T_i(m,n) - T_j(m,n))^2.$$

It is denoted that $D_{i\pi(i)} = \min D_{ij}$, which indicates that a point $Y_{\pi(i)}$ in the standard character template $\Delta$ is a best matching point for the point $X_i$.

A total distance from the character $\Theta$ to be recognized to the standard character template $\Delta$ is $$D_{\Theta\Delta} = \sum_{i=0}^{M} D_{i\pi(i)}.$$

In a case that there are total $\Gamma$ standard character templates, total distances from the character $\Theta$ to be recognized to each standard character template are calculated respectively, and a template with a minimal distance to the character is a recognition result for the character.

By the character recognition method provided according to the embodiment, features of each edge point of a character are expressed by using distances from rest edge points of the character to the edge point of the character, then eigenvectors of each character are converted into matrixes with a same dimension, and template matching recognition is performed, so that overall features of the entire character is ensured, features of different characters are better differentiated, a problem that features extracted from similar regions of different characters are highly similar in a conventional feature extracting method is overcome, thereby improving a character recognition rate.

The above are preferable embodiments of the disclosure. It should be noted that for people of ordinary skill in the art, some modifications and improvements may be made within the principle of the disclosure. These modifications and improvements are within the protection scope of the claims.

The invention claimed is:

1. A character recognition method, comprising the steps of:

1: reading, by a processor, a character image;

2: performing image preprocessing on the read character image;

3: performing character segmentation on the preprocessed character image;

4: edge extraction, comprising detecting edge points of the character by using an edge detecting operator;

5: feature extraction, performing expressing features of each edge point of each character by distances from edge points of the character other than the edge point to the edge point, wherein the features of the edge point of the character are represented by an eigenvector $(P_{1k}, P_{2k} \ldots P_{Mk})$, thus eigenvectors of features of the character are represented by a matrix $$\begin{pmatrix} P_{21} & P_{31} & \ldots & P_{M1} \\ P_{12} & P_{32} & \ldots & P_{M2} \\ \vdots & \vdots & \ddots & \vdots \\ P_{1M} & P_{2M} & \ldots & P_{(M-1)M} \end{pmatrix};$$

6: feature processing, performing mapping the eigenvector $(P_{1k}, P_{2k} \ldots P_{Mk})$ to a matrix T, to obtain a same dimension for eigenvectors of all characters, wherein $$T = \begin{pmatrix} t_{11} & t_{12} & \ldots & t_{1v} \\ t_{21} & t_{22} & \ldots & t_{2v} \\ \vdots & \vdots & \ddots & \vdots \\ t_{u1} & t_{u2} & \ldots & t_{uv} \end{pmatrix};$$

and

7: template matching comprising assuming that an edge of a character $\Theta$ to be recognized has M points $X_1$, $X_2 \ldots X_M$ and a standard character template $\Delta$ has N points $Y_1, Y_2 \ldots Y_N$ calculating a distance between the point $X_i$ and the point $Y_j$ in the standard character template $\Delta$ by an equation as:

$$D_{ij} \equiv D(X_i, Y_j) = \sum_{m=1}^{u} \sum_{n=1}^{v} (T_i(m, n) - T_j(m, n))^2;$$

denoting $D_{i\pi(i)} = \min D_{ij}$, which indicates that a point $Y_{\pi(i)}$ in the standard character template $\Delta$ is a best matching point for the point $X_i$, a total distance from the character $\Theta$ to be recognized to the standard character template $\Delta$ being $$D_{\Theta\Delta} = \sum_{i=0}^{M} D_{i\pi(i)};$$

and in a case that there are total $\Gamma$ standard character templates, calculating total distances from the character $\Theta$ to be recognized to each standard character template respectively, and a template with a minimal distance to the character is a recognition result for the character.

2. The character recognition method according to claim 1, wherein the mapping the eigenvector $(P^{1k}, P_{2k} \ldots P_{Mk})$ to a matrix T in step 6 comprises:

step 61 comprising: assuming one component $P_{ij}$ of an eigenvector of any point of edge of a character as $P_{ij} = (l_{ij}, \theta_{ij})$, wherein $l_{ij} \in [0, L]$ and $\theta_{ij} \in [0, 2\pi]$, forming a block matrix by dividing the interval $[0, L]$ into u equal parts and dividing the interval $[0, 2\pi]$ into v equal parts, and mapping each component of the eigenvector of any point of the edge of the character to the block matrix according to values of $l_{ij}$ and $\theta_{ij}$; and step 62 comprises: setting that a component $t_{ij}$ of T is the number of eigen components $P_{ij}$ mapped to a jth block in an ith row, then the eigenvector $(P_{1k}, P_{2k} \ldots P_{Mk})$ of any point is converted into a u×v matrix T; and step 63 comprising: representing all features of each character as $$\begin{pmatrix} T_1 \\ T_2 \\ \vdots \\ T_M \end{pmatrix},$$

wherein each component $T_i$ is a u×v matrix.

3. The character recognition method according to claim 1, wherein the image preprocessing in step 2 comprises image denoising, image rotation correction and image binarization.

4. The character recognition method according to claim 3, wherein the character segmentation in step 3 comprises: performing horizontal projection and vertical projection on the binarized character image to segment the binarized character image into characters.

* * * * *